US012772098B2

(12) United States Patent
Li

(10) Patent No.: US 12,772,098 B2
(45) Date of Patent: Oct. 20, 2026

(54) RESOURCE UNIT ALLOCATION METHOD AND APPARATUS, AND STORAGE MEDIUM AND ELECTRONIC APPARATUS

(71) Applicant: ZTE Corporation, Shenzhen (CN)

(72) Inventor: Yan Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 316 days.

(21) Appl. No.: 18/696,018

(22) PCT Filed: Feb. 17, 2022

(86) PCT No.: PCT/CN2022/076688
§ 371 (c)(1),
(2) Date: Mar. 27, 2024

(87) PCT Pub. No.: WO2023/045228
PCT Pub. Date: Mar. 30, 2023

(65) Prior Publication Data
US 2024/0397371 A1 Nov. 28, 2024

(30) Foreign Application Priority Data
Sep. 27, 2021 (CN) .......................... 202111139038.3

(51) Int. Cl.
*H04W 28/02* (2009.01)
*H04W 72/542* (2023.01)

(52) U.S. Cl.
CPC ... *H04W 28/0236* (2013.01); *H04W 28/0278* (2013.01); *H04W 72/542* (2023.01)

(58) Field of Classification Search
CPC ......... H04W 28/0236; H04W 28/0278; H04W 72/542; H04W 72/21; H04W 72/569;
(Continued)

(56) References Cited

U.S. PATENT DOCUMENTS

2016/0227533 A1* 8/2016 Josiam ................ H04W 74/006
2017/0332385 A1* 11/2017 Shirali ............. H04W 28/0278
(Continued)

FOREIGN PATENT DOCUMENTS

CN 101018362 A 8/2007
CN 106550457 A 3/2017
(Continued)

OTHER PUBLICATIONS

European Search Report for corresponding application EP22871294: mail date Dec. 2, 2024.
(Continued)

*Primary Examiner* — Ivan O Latorre
(74) *Attorney, Agent, or Firm* — CANTOR COLBURN LLP

(57) ABSTRACT

Embodiments of the present disclosure provide a resource unit allocation method and apparatus, and a storage medium and an electronic apparatus. The method includes: acquiring target information reported by a target station, where the target information includes target buffer information to be transmitted by the target station, and at least one of the type or target delay information of the target buffer information; and allocating a target Resource Unit (RU) to the target station based on the target information, and instructing the target station to transmit the target buffer information by using the target RU.

18 Claims, 5 Drawing Sheets

(58) Field of Classification Search
CPC ........... H04W 74/0816; H04W 74/006; H04W 84/12; H04W 28/14; H04W 74/04; H04W 74/0875; H04L 47/28; H04L 47/30
See application file for complete search history.

(56) References Cited

U.S. PATENT DOCUMENTS

| | | | | |
|---|---|---|---|---|
| 2019/0124669 A1* | 4/2019 | Luo | ......................... | H04W 4/44 |
| 2020/0163109 A1* | 5/2020 | Zhang | ................... | H04W 72/23 |
| 2022/0312261 A1* | 9/2022 | Vangala | ................ | H04W 72/21 |
| 2024/0397371 A1* | 11/2024 | Li | ........................... | H04L 47/30 |
| 2024/0430740 A1* | 12/2024 | Lu | ..................... | H04W 28/0278 |

FOREIGN PATENT DOCUMENTS

| | | |
|---|---|---|
| CN | 107040557 A | 8/2017 |
| WO | 2021075933 A1 | 4/2021 |

OTHER PUBLICATIONS

International Search Report for corresponding application PCT/CN2022/076688 filed Feb. 17, 2022; Mail date May 30, 2022.

* cited by examiner the formate of BSR* control field

RESOURCE UNIT ALLOCATION METHOD AND APPARATUS, AND STORAGE MEDIUM AND ELECTRONIC APPARATUS

CROSS-REFERENCE TO RELATED APPLICATION

The disclosure is a national stage filing under 35 U.S.C. § 371 of international application number PCT/CN2022/076688, filed Feb. 17, 2022, which claims priority to Chinese Patent Application No. CN202111139038.3 filed on Sep. 27, 2021, the disclosure of which is hereby incorporated by reference in its entirety.

TECHNICAL FIELD

Embodiments of the present disclosure relate to the field of communications, and specifically to a resource unit allocation method and apparatus, and a storage medium and an electronic apparatus.

BACKGROUND

In 802.11AX, an existing Up Link-Orthogonal Frequency Division Multiple Access (UL-OFDMA) technology are suitable for scenarios where multiple users simultaneously transmit uplink data. Different from a traditional serial access mode of multi-user transmission that requires competition for transmission opportunities to achieve channel access, multi-user uplink parallel transmission in UL-OFDMA effectively reduces the delay of multi-user uplink transmission. However, for each user, single UL-OFDMA cannot ensure that all buffer data of the user complete uplink transmission, such that the existing UL-OFDMA technology cannot complete transmission as required for the buffer data, for example, in uplink data transmission scenarios with high low delay requirements.

No effective solution has been proposed yet for the problem in the related art that data transmission cannot be accomplished according to requirements of buffer information.

SUMMARY

Embodiments of the present disclosure provide a resource unit allocation method and apparatus, and a storage medium and an electronic apparatus, to at least solve the problem in the related art that data transmission cannot be accomplished according to requirements of buffer information.

An embodiment of the present disclosure provides a Resource Unit (RU) allocation method, including: acquiring target information reported by a target station, wherein the target information includes target buffer information to be transmitted by the target station, and at least one of the following information: the type of the target buffer information, target delay information of the target buffer information; and allocating a target RU to the target station based on the target information, and instructing the target station to transmit the target buffer information by using the target RU.

In an exemplary embodiment, the method includes: determining that the type of the target buffer information is low delay and the target delay information is valid data when the target information includes a first field and a second field and when the first field includes a first character. The first field is used for identifying the type of the target buffer information, and the second field is used for identifying the target delay information.

In an exemplary embodiment, the method includes: determining that the type of the target buffer information is non-low delay and the target delay information is invalid data when the target information includes a first field and a second field and when the first field includes a second character. The first field is used for identifying the type of the target buffer information, and the second field is used for identifying the target delay information.

In an exemplary embodiment, the method includes: determining that the type of the target buffer information is low delay and the target delay information is valid data when the target information only includes a second field. The second field is used for identifying the target delay information.

In an exemplary embodiment, the method includes: when the target information only includes a first field, determining the type of the target buffer information and the target delay information of the target buffer information based on the type of an Access Classification (AC) included in the target buffer information. The first field is used for identifying the type of the target buffer information.

In an exemplary embodiment, the AC includes at least one of the following classifications: AC_Voice, AC_Video, AC_Best-effort, or AC_Background. The AC_Voice has a higher priority than the AC_Video, the AC_Video has a higher priority than the AC_Best-effort, and the AC_Best-effort has a higher priority than the AC_Background. Determining the type of the target buffer information and the target delay information of the target buffer information based on the type of the AC included in the target buffer information includes: when the AC included in the target buffer information includes a first target classification, determining that the type of the target buffer information is low delay, where the first target classification is a classification that is preset with corresponding default delay in advance; and determining the target delay information based on default delay information corresponding to a classification with the highest priority included in the first target classification.

In an exemplary embodiment, the AC includes at least one of the following classifications: AC_Voice, AC_Video, AC_Best-effort, or AC_Background. The AC_Voice has a higher priority than the AC_Video, the AC_Video has a higher priority than the AC_Best-effort, and the AC_Best-effort has a higher priority than the AC_Background. Determining the type of the target buffer information and the target delay information of the target buffer information based on the type of the AC included in the target buffer information includes: when the AC included in the target buffer information only includes a second target classification, determining that the type of the target buffer information is non-low delay. The second target classification is a classification that is not set with corresponding default delay.

In an exemplary embodiment, the target delay information includes at least one of the following: a target delay length: or target delay jitter information.

In an exemplary embodiment, allocating the target RU to the target station based on the target information includes: determining first type stations included in a plurality of stations that currently need to perform buffer information transmission, where the first type station is a station that needs to transmit low delay information, and the first type station includes the target station; and allocating the target RU to the target station based on the target information and the first type station.

In an exemplary embodiment, when it is determined that the first type station only includes the target station, the target information includes the target delay length, and it is determined that the transmission of the target buffer information needs to be accomplished through a plurality of transmissions, the target RU is allocated to the target station based on the following formula: N1>=B*N(all)/(A*Vmax), where N1 is the number of subcarriers in the target RU. B=buffer size*overhead, buffer size is the number of buffer frames included in the target buffer information, overhead is an average frame length of the plurality of buffer frames included in the target buffer information. A=delay time−T0−3*SIFS−Time(MU BA)−Time(Basic variant Trigger), delay time is the target delay length. T0+T1 is a full time duration for completing overall interaction between the target station and an Access Point (AP). T1=3*SIFS+Time(MU BA)+Time(Basic variant Trigger)+Time(TB PPDU). SIFS is a short interframe gap for frame interaction between the target station and the AP. Time(MU BA) is a time duration that the AP replies MU BA to the target station. Time(Basic variant Trigger) is a time duration that the AP allocates the target RU to the target station, Time(TB PPDU) is a time duration that the target station transmits the target buffer information, Time(TB PPDU)=(buffer size*overhead)/V1, V1 is a physical layer transmission rate of the target station under the allocation of the target RU and V1=Vmax*N1/N(all), Vmax is a physical layer transmission rate negotiated by the target station during full bandwidth transmission, and N(all) is the number of subcarriers in a full bandwidth.

In an exemplary embodiment, when it is determined that the first type station only includes the target station, the target information includes the target delay length, and it is determined that the transmission of the target buffer information needs to be accomplished through a plurality of transmissions, the target RU is allocated to the target station based on the following formula: B1/N1+B2/N2+ . . . +Bm/N(m)<=C*Vmax/N(all), where Bj=buffer size(j)*overhead (j), 0<j≤m, buffer size (j) is the number of buffer frames included in the target buffer information that is transmitted by the target station in a jth transmission, overhead (j) is an average frame length of the plurality of buffer frames included in the target buffer information that is transmitted by the target station in the jth transmission, C=delay time−m*[3*SIFS+Time(MU BA)+Time(Basic variant Trigger)]−T0, delay time is the target delay length, Tj=3*SIFS+Time (MU BA)+Time(Basic variant Trigger)+Time[TB PPDU (j)], T0+T1+T2 . . . +Tm is a full time duration for completing overall interaction between the target station and an AP, SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time(TB PPDU (j)) is a time duration of the jth transmission of the target buffer information by the target station, Time[TB PPDU(j)] =[buffer size(j)*overhead(j)]N(j), Vj is a physical layer transmission rate of the target station in the jth transmission and V(j)=Vmax*N(j)/N(all), Vmax is a physical layer transmission rate negotiated by the target station during full bandwidth transmission, NO) is the number of subcarriers in the target RU allocated by the target station at the jth transmission, and N(all) is the number of subcarriers in a full bandwidth.

In an exemplary embodiment, when it is determined that the first type station includes the plurality of stations, the target information includes the target delay length, it is determined that the transmission of buffer information to be transmitted in the plurality of stations included in the first type station needs to be accomplished through a single transmission, and the target station is an ith station in the plurality of stations included in the first type station, the target RU is allocated to the target station based on the following formula: N(i)>=B(i)*N(all)/(A(i)*V(i)max) and N(1)+N(2)+ . . . +N(n)<=N(all), where n is the number of all stations included in the first type station, A(i)=delay time (i)−T0−3*SIFS−Time(MU BA)−Time(Basic variant Trigger), B(i)=buffer size(i)*overhead(i), buffer size (i) is the number of buffer frames included in the target buffer information, overhead (i) is an average frame length of the plurality of buffer frames included in the target buffer information, T0+3*SIFS+Time(MU BA)+Time(Basic variant Trigger)+Time(TB PPDU(i))<=delay time(i), T0+T1 is a full time duration for completing overall interaction between the target station and an AP, SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time(TB PPDU(i)) is a time duration that the target station transmits the target buffer information and Time(TB PPDU(i))=(buffer size(i)*overhead(i))/Vi, Vi is a physical layer transmission rate of the target station under the allocation of the target RU and Vi=V(i)max*N(i)/N(all), V(i) max is a physical layer transmission rate negotiated by the target station during full bandwidth transmission, N(all) is the number of subcarriers in a full bandwidth, and N(i) is the number of subcarriers in the target RU.

In an exemplary embodiment, when it is determined that the first type station includes the plurality of stations, the target information includes the target delay length, it is determined that the first type station needs to accomplish the transmission of buffer information to be transmitted in the plurality of stations included in the first type station through a plurality of transmissions, and the target station is an ith station in the plurality of stations included in the first type station, the target RU is allocated to the target station based on the following formula: B(i,1)/N(i,1)+B(i,2)/N(i,2)+ . . . +B(i,m)/N(i,m)<=C*V(i)max/N(all) and N(1,j)+N(2,j)+ . . . +N(n,j)<=N(all), where N(i,j) represents the number of subcarriers in the target RU allocated to the target station during a jth transmission, 0<j≤m, N(all) is the number of subcarriers in a full bandwidth, B(i,j)=buffer size(i,j)*overhead(i,j), buffer size (i,j) is the number of buffer frames included in the target buffer information that is transmitted by the target station in a jth transmission, overhead (i,j) is an average frame length of the plurality of buffer frames included in the target buffer information that is transmitted by the target station in the jth transmission, C=delay time (i)−m*[3*SIFS+Time(MU BA)+Time(Basic variant Trigger)]−T0, delay time (i) is the target delay length, SIFS is a short interframe gap for frame interaction between the target station and the AP, T(i,j)=3*SIFS+Time(MU BA)+Time (Basic variant Trigger)+Time[TB PPDU(i)], T0+T(i,1)+T(i, 2) . . . +T(i,m)<=delay time(i), Time(MU BA) is a time duration that the AP replies MU BA to the target station, Time(Basic variant Trigger) is a time duration that the AP allocates the target RU to the target station, Time(TB PPDU (i,j) is a time duration of the jth transmission of the target buffer information by the target station and Time[TB PPDU (i,j)]=[buffer size(i,j)*overhead(i,j)]/V(i,j), V(i,j) is a physical layer transmission rate of the target station in the jth transmission and V(i,j)=V(i)max*N(i,j)/N(all), V(i)max is a physical layer transmission rate negotiated by the target station during full bandwidth transmission, N(all) is the number of subcarriers in a full bandwidth, N(i,j) is the number of subcarriers in the target RU allocated by the target station at the jth transmission.

Another embodiment of the present disclosure provides a resource unit allocation apparatus, including: an acquisition module, configured to acquire target information reported by a target station, where the target information includes target buffer information to be transmitted by the target station, and at least one of the following information: the type of the target buffer information or target delay information of the target buffer information; and an allocation module, configured to allocate a target resource unit to the target station based on the target information, and instruct the target station to transmit the target buffer information by using the target resource unit.

Still another embodiment of the present disclosure further provides a computer-readable storage medium. The computer-readable storage medium stores a computer program. Steps in any one of the above method embodiments are executed when the computer program is configured to operate.

Still another embodiment of the present disclosure further provides an electronic apparatus. The electronic apparatus includes a memory and a processor. The memory stores a computer program. The processor is configured to operate the computer program to execute steps in any one of the above method embodiments.

BRIEF DESCRIPTION OF THE DRAWINGS

The accompanying drawings described herein are used to provide a further understanding of the present disclosure, and constitute a part of the present disclosure. The exemplary embodiments of the present disclosure and the description thereof are used to explain the present disclosure, but do not constitute improper limitations to the present disclosure.

In the drawings.

DETAILED DESCRIPTION OF THE EMBODIMENTS

In order to enable those skilled in the art to better understand the solutions of the present disclosure, the technical solutions in the embodiments of the present disclosure will be clearly and completely described below in combination with the drawings in the embodiments of the present disclosure. It is apparent that the described embodiments are only part of the embodiments of the present disclosure, not all the embodiments. Based on the embodiments in the present disclosure, all other embodiments obtained by those of ordinary skill in the art without creative work shall all fall within the protection scope of the present disclosure.

It is to be noted that terms "first", "second" and the like in the description, claims and the above-mentioned drawings of the present disclosure are used for distinguishing similar objects rather than describing a specific sequence or a precedence order. It should be understood that the data used in such a way may be exchanged where appropriate, in order that the embodiments of the present disclosure described here can be implemented in an order other than those illustrated or described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

Figure 1:
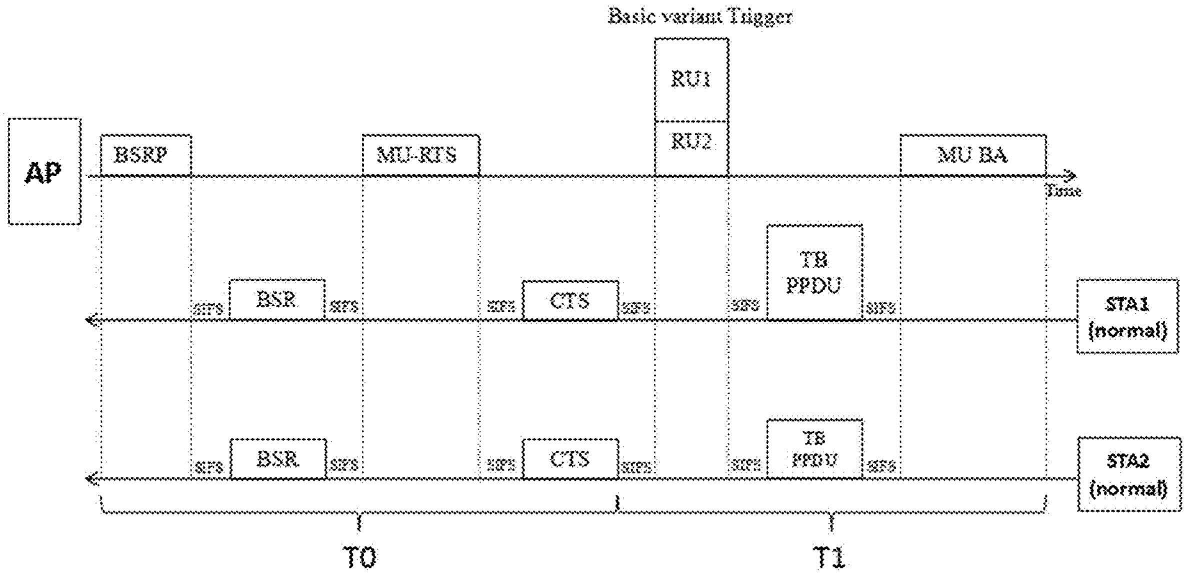
FIG. 1 is a schematic diagram of a UL-OFDMA data transmission flow in the related art.

In the related art, UL-OFDMA data transmission is divided into 3 phases. FIG. 1 is a schematic diagram of a UL-OFDMA data transmission flow in the related art. As shown in FIG. 1, the flow includes the following 3 phases.

1) BSRP/BSR: an AP sends a BSRP trigger frame to collect buffer information from each Station (STA), and the STA reports the buffer information to the AP through BSR. The priority and size of buffer data are identified in the BSR.

2) MU-RTS/CTS: the AP occupies a transmission medium (notifying other devices to not attempt channel access during a current transmission period) for subsequent transmission of UL-OFDMA.

3) Basic variant Trigger/TB PPDU/MU BA: the AP allocates an RU for each STA in Basic variant Trigger; the STA subsequently transmits uplink TB PPDU by using a frequency band corresponding to the RU allocated by the AP; and the AP replies to MU BA to confirm successful data transmission after receiving the uplink TB PPDU sent by each STA.

Figure 2:
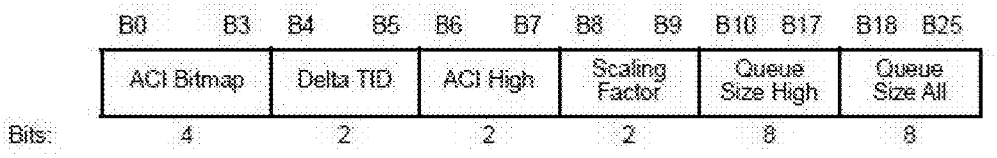
FIG. 2 is a schematic format diagram of a Buffer Status Report (BSR) control field in the related art.

In an 802.11AX network, if an AP supports a BSR control field, a terminal may perform BSR information feedback in the BSR control field added in any frame sent. FIG. 2 is a schematic format diagram of a Buffer Status Report (BSR) control field in the related art. As shown in FIG. 2, the 802.11AX identifies different QoS access categories through an ACI High field, and feeds back specific Buffer information through a Queue Size High field. The 802.11AX terminal may also report buffer situations of a plurality of QoS categories, which needs to be fed back through ACI Bitmap, Delta TID, and Queue Size All fields in FIG. 2. The ACI Bitmap and Delta TID identify access categories of a plurality of QoS. The Queue Size All field identifies buffer situations corresponding to the field. A Scaling Factor field represents a scaling factor, which is used for indicating a unit size of buffer.

Figure 3:
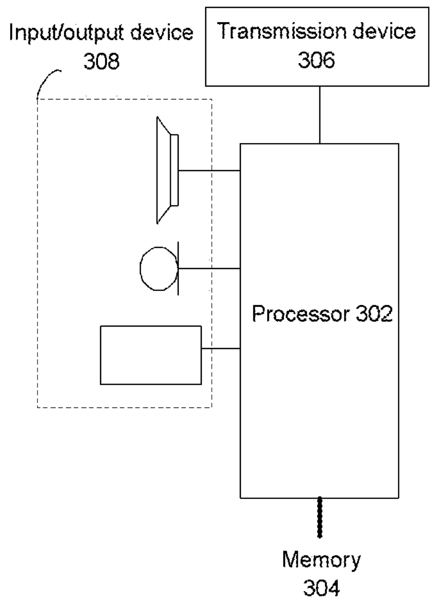
FIG. 3 is a block diagram of a hardware structure of a mobile terminal of a resource unit allocation method according to an embodiment of the present disclosure.

The method embodiments provided in the embodiments of the present disclosure may be executed in a mobile terminal, a computer terminal or a similar computing apparatus. By being operated on the mobile terminal as an example, FIG. 3 is a block diagram of a hardware structure of a mobile terminal of a resource unit allocation method according to an embodiment of the present disclosure. As shown in FIG. 3, the mobile terminal may include one or more (only one is shown in FIG. 3) processors 302 (the processor 302 may include, but is not limited to, a processing apparatus such as a microprocessor MCU or a programmable logic device FPGA) and a memory 304 configured to store data. The above mobile terminal may further include a transmission device 306 configured to achieve a communication function, and an input/output device 308. Those skilled in the art may understand that the structure shown in FIG. 3 is only a schematic diagram, which does not limit the structure of the above mobile terminal. For example, the mobile terminal may also include more or less components than those shown in FIG. 3, or have a different configuration from that shown in FIG. 3.

The memory 304 may be configured to store a computer program, for example, a software program and a module of application software, such as a computer program corresponding to a resource unit allocation method in the embodiments of the present disclosure. The processor 302 runs the computer program stored in the memory 304, so as to execute various functional applications and data processing, i.e., to realize the above method. The memory 304 may include a high-speed random access memory, and may further include a non-volatile memory, such as one or more magnetic disk memory apparatuses, a flash memory device, or other non-volatile solid-state memory devices. In some embodiments, the memory 304 may further include memories remotely disposed relative to the processor 302. The remote memories may be connected to the mobile terminal by using a network. Examples of the above network include, but are not limited to, the Internet, an intranet, a local area network, a mobile communication network and a combination thereof.

The transmission apparatus 306 is configured to receive or send data via the network. The specific example of the above network may include a wireless network provided by a communication provider of the mobile terminal. In an example, the transmission apparatus 306 includes a Network Interface Controller (NIC), and may be connected to other network devices by using a base station, so as to communicate with the Internet. In an example, the transmission apparatus 306 is a Radio Frequency (RF) module, which is configured to communicate with the Internet in a wireless manner.

Figure 4:
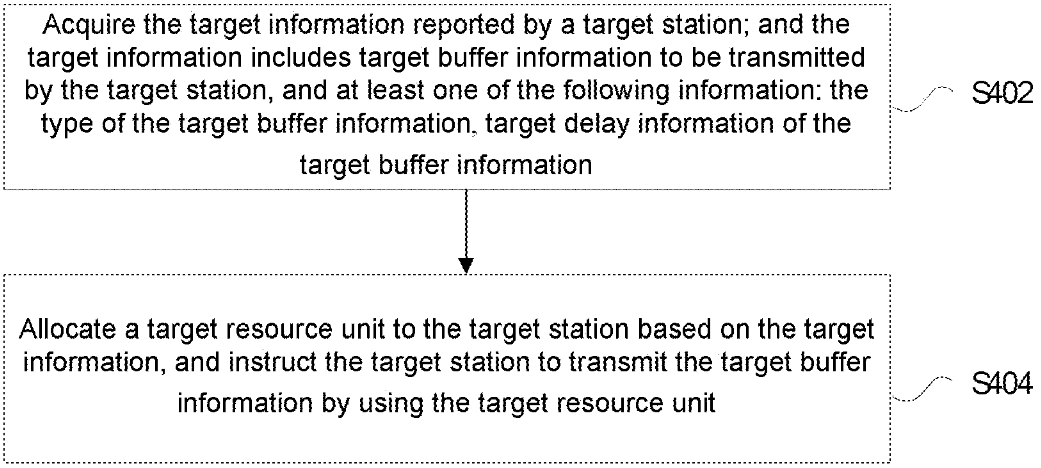
FIG. 4 is a flowchart of a resource unit allocation method according to an embodiment of the present disclosure.

This embodiment provides a resource unit allocation method. FIG. 4 is a flowchart of a resource unit allocation method according to an embodiment of the present disclosure. As shown in FIG. 4, the flow includes the following steps.

At S402, target information reported by a target station is acquired; and the target information includes target buffer information to be transmitted by the target station, and at least one of the following pieces of information: the type of the target buffer information or target delay information of the target buffer information.

At S404, a target RU is allocated to the target station based on the target information, and the target station is instructed to transmit the target buffer information by using the target RU.

Through the above steps, the acquired target information includes the target buffer information to be transmitted by the target station, and at least one of the type or target delay information of the target buffer information, and the target RU is allocated to the target station based on the target information, such that the purpose of allocating an RU based on requirements of the target information is achieved. Therefore, the problem in the related art that data transmission cannot be accomplished according to requirements of buffer information may be solved, thereby achieving the effect of improving data transmission efficiency.

An execution subject of the above steps may be an AP, for example, the AP in the 802.11 AX network. The execution subject of the above steps may also be other processing devices or processing units having similar processing capabilities, but is not limited thereto. The following is described with an example (only an exemplary description, in practice, there may be other devices or modules to execute the above operations) that the AP executes the above operations.

In the above embodiments, the AP acquires the target information reported by the target station. The target information includes the target buffer information to be transmitted by the target station, and at least one of the type or target delay information of the target buffer information. For example, the type of the target buffer information may be used for indicating whether the target buffer information belongs to low delay data information. The target delay information may include the target delay length and/or the target delay jitter information. The target delay length is used for indicating that the target station expects that reported low delay data could be transmitted within a time corresponding to the target delay length, for example, the target delay length is Tms, 2 ms, or other time. The target RU is allocated to the target station based on the target information, and the target station is instructed to transmit the target buffer information by using the target RU. In a practical application, when the AP determines that the target buffer information is low delay information, a larger RU space may be allocated for data transmission of the corresponding target station. Through this embodiment, the purpose of allocating an RU based on requirements of the target information is achieved, such that the problem in the related art that data transmission cannot be accomplished according to requirements of buffer information may be solved, thereby achieving the effect of improving data transmission efficiency.

In an optional embodiment, it is determined that the type of the target buffer information is low delay and the target delay information is valid data when the target information includes a first field and a second field and when the first field includes a first character. The first field is used for identifying the type of the target buffer information, and the second field is used for identifying the target delay information. In this embodiment, the type and target delay information of the target buffer information are determined according to a specific situation that the target information includes the first field and/or the second field. For example, when the target information includes the first field and the second field, the type of the target buffer information may be determined through different situations that the first field includes the first character or a second character. For example, when the first field includes the first character, it is determined that the type of the target buffer information is the low delay data information; and when the first field includes the first character, the target delay information is valid. In a practical application, 2 fields, which respectively are delay tag (corresponding to the first field) and delay time (corresponding to the second field) may be added to buffer information BSR reported by the target station. Through this embodiment, the purpose of indicating the type or target delay information of the target buffer information through the first field and/or second field included in the target information is achieved.

In an optional embodiment, it is determined that the type of the target buffer information is non-low delay and the target delay information is invalid data when the target information includes a first field and a second field and when the first field includes a second character. The first field is used for identifying the type of the target buffer information, and the second field is used for identifying the target delay information. In this embodiment, the type and target delay information of the target buffer information are determined according to a specific situation that the target information includes the first field and/or the second field. For example, when the target information includes the first field and the second field, the type of the target buffer information may be determined through different situations that the first field includes the first character or a second character. For example, when the first field includes the second character, it is determined that the type of the target buffer information is non-low delay data information; and when the first field includes the second character, the target delay information is invalid data. In a practical application, 2 fields, which respectively are a delay tag (corresponding to the first field) and delay time (corresponding to the second field) may be added to buffer information BSR reported by the target station. Through this embodiment, the purpose of indicating the type or target delay information of the target buffer information through the first field and/or second field included in the target information is achieved.

In an optional embodiment, it is determined that the type of the target buffer information is low delay and the target delay information is valid data when the target information only includes a second field. The second field is used for identifying the target delay information. In this embodiment, when the target information only includes the second field, i.e., when the first field does not exist and the second field exists, it defaults to the low delay information. In a practical application, 2 fields, which respectively are a delay tag (corresponding to the first field) and delay time (corresponding to the second field) may be added to buffer information BSR reported by the target station. Through this embodiment, the purpose of indicating the type or target delay information of the target buffer information through the first field and/or second field included in the target information is achieved.

In an optional embodiment, when the target information only includes the first field, the type of the target buffer information and the target delay information of the target buffer information are determined based on the type of an Access Classification (AC) included in the target buffer information. The first field is used for identifying the type of the target buffer information. In this embodiment, when the target information only includes the first field, i.e., when the first field exists and the second field does not exist, a default value of the target delay length is set according to the highest priority AC in the target buffer information to be transmitted by the target station. In a practical application, 2 fields may be newly added to the buffer information BSR reported by the target station, respectively being a delay tag (corresponding to the first field) and delay time (corresponding to the second field). Through this embodiment, the purpose of indicating the type or target delay information of the target buffer information through the first field and/or second field included in the target information is achieved.

In an optional embodiment, the AC includes at least one of the following classifications: AC_Voice, AC_Video, AC_Best-effort, or AC_Background. The AC_Voice has a higher priority than the AC_Video, the AC_Video has a higher priority than the AC_Best-effort, and the AC_Best-effort has a higher priority than the AC_Background. Determining the type of the target buffer information and the target delay information of the target buffer information based on the type of the AC included in the target buffer information includes: when the AC included in the target buffer information includes a first target classification, determining that the type of the target buffer information is low delay, where the first target classification is a classification that is preset with corresponding default delay in advance; and determining the target delay information based on default delay information corresponding to a classification with the highest priority included in the first target classification. For example, when the target buffer information includes a highest priority level and buffer information, priorities are AC_Voice, AC_Video, AC_Best-effort, and AC_Background in sequence from high to low. 4 corresponding default values are set for the 4 priorities, such that it may be determined that the type of the target buffer information is low delay, and the target delay information is determined based on 4 pieces of default delay information.

In an optional embodiment, the AC includes at least one of the following classifications: AC_Voice, AC_Video, AC_Best-effort, or AC_Background. The AC_Voice has a higher priority than the AC_Video, the AC_Video has a higher priority than the AC_Best-effort, and the AC_Best-effort has a higher priority than the AC_Background. Determining the type of the target buffer information and the target delay information of the target buffer information based on the type of the AC included in the target buffer information includes: when the AC included in the target buffer information only includes a second target classification, determining that the type of the target buffer information is non-low delay. The second target classification is a classification that is not set with corresponding default delay. For example, when 2 corresponding default values are set for the AC_Voice and the AC_Video, or when the highest priority is the AC_Best-effort or the AC_Background, it is determined that the buffer information is non-low delay information.

In an optional embodiment, the target delay information includes at least one of the following: a target delay length; or target delay jitter information.

In an optional embodiment, allocating the target RU to the target station based on the target information includes: determining first type stations included in a plurality of stations that currently need to perform buffer information transmission, where the first type station is a station that needs to transmit low delay information, and the first type station includes the target station; and allocating the target RU to the target station based on the target information and the first type station. In this embodiment, the first type station that needs to transmit the low delay information is determined from the plurality of stations. There may be one or more first type stations in the plurality of stations. The first type station includes the target station, and then the target RU is allocated for the target station based on the target information and the first type station, such that the purpose of allocating, based on the target information, the target RU for the station that needs to transmit the low delay information is achieved.

In an optional embodiment, when it is determined that the first type station only includes the target station, the target information includes the target delay length, and it is determined that the transmission of the target buffer information needs to be accomplished through a plurality of transmissions, the target RU is allocated to the target station based on the following formula: $N1>=B*N(all)/(A*Vmax)$, where N1 is the number of subcarriers in the target RU, B=buffer size*overhead, buffer size is the number of buffer frames included in the target buffer information, overhead is an average frame length of the plurality of buffer frames included in the target buffer information, A=delay time−T0−3*SIFS−Time(MU BA)−Time(Basic variant Trigger), delay time is the target delay length, T0+T1 is a full time duration for completing overall interaction between the target station and an Access Point (AP), T1=3*SIFS+Time(MU BA)+Time(Basic variant Trigger)+Time(TB PPDU), SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time(TB PPDU) is a time duration that the target station transmits the target buffer information, Time(TB PPDU)=(buffer size*overhead)/V1, V1 is a physical layer transmission rate of the target station under the allocation of the target RU and V1=Vmax*N1/N(all), Vmax is a physical layer transmission rate negotiated by the target station during full bandwidth transmission, and N(all) is the number of subcarriers in a full bandwidth. In this embodiment, when it is determined that the first type station only includes the target station, the target information includes the target delay length, and the transmission of the target buffer information needs to be accomplished at one time, the target RU is allocated for the target station through the above formula N1>=B*N(all)/(A*Vmax), then which RU is allocated is determined in combination with RU allocation criteria of OFDMA, e.g., 26-tone, 52-tone, 106 tone, etc., and the target station subsequently transmits uplink TB PPDU by using a frequency band corresponding to the target RU allocated by the AP, such that the purpose of accomplishing a single transmission of low delay data reported by the target station within delay time may be achieved. Therefore, the problem in the related art that data transmission with high low delay requirements cannot be met is solved, thereby achieving the effect of improving data transmission efficiency.

In an optional embodiment, when it is determined that the first type station only includes the target station, the target information includes the target delay length, and it is determined that the transmission of the target buffer information needs to be accomplished through a plurality of transmissions, the target RU is allocated to the target station based on the following formula: B1/N1+B2/N2+ . . . +Bm/N(m)<=C*Vmax/N(all), where Bj=buffer size(j)*overhead(j), 0<j≤m, buffer size j) is the number of buffer frames included in the target buffer information that is transmitted by the target station in a jth transmission, overhead (j) is an average frame length of the plurality of buffer frames included in the target buffer information that is transmitted by the target station in the jth transmission, C=delay time−m*[3*SIFS+Time(MU BA)+Time(Basic variant Trigger)]−T0, delay time is the target delay length, Tj=3*SIFS+Time(MU BA)+Time(Basic variant Trigger)+Time[TB PPDU(j)], T0+T1+T2 . . . +Tm is a full time duration for completing overall interaction between the target station and an AP, SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time(TB PPDU(j)) is a time duration of the jth transmission of the target buffer information by the target station, Time[TB PPDU(j)]=[buffer size(j)*overhead(j)]N(j), Vj is a physical layer transmission rate of the target station in the jth transmission and V(j)=Vmax*N(j)/N(all), Vmax is a physical layer transmission rate negotiated by the target station during full bandwidth transmission, N(j) is the number of subcarriers in the target RU allocated by the target station at the jth transmission, and N(all) is the number of subcarriers in a full bandwidth. In this embodiment, when it is determined that the first type station only includes the target station and the target information includes the target delay length, but low delay buffer data of the target station cannot be guaranteed to be completed in a single OFDMA uplink transmission, i.e., when it is determined that the transmission of the target buffer information needs to be accomplished through a plurality of transmissions, the target RU is allocated for the target station through the formula B1/N1+B2/N2+ . . . +Bm/N(m)<=C*Vmax/N(all), where N1, N2, . . . ,Nm respectively are the number of subcarriers in the target RU allocated to the target station during each transmission, and the target station subsequently transmits the uplink TB PPDU by using the frequency band corresponding to the target RU allocated by the AP, such that the purpose of accomplishing low delay data transmission by the target station through a plurality of uplink transmissions within delay time may be achieved. Therefore, the problem in the related art that data transmission with high low delay requirements cannot be met is solved, thereby achieving the effect of improving data transmission efficiency.

In an optional embodiment, when it is determined that the first type station includes the plurality of stations, the target information includes the target delay length, it is determined that the transmission of buffer information to be transmitted in the plurality of stations included in the first type station needs to be accomplished through a single transmission, and the target station is an ith station in the plurality of stations included in the first type station, the target RU is allocated to the target station based on the following formula: N(i)>=B(i)*N(all)/(A(i)*V(i)max) and N(1)+N(2)+ . . . +N(n)<=N(all), where n is the number of all stations included in the first type station, A(i)=delay time (i)−T0−3*SIFS−Time(MU BA)−Time(Basic variant Trigger), B(i)=buffer size(i)*overhead(i), buffer size (i) is the number of buffer frames included in the target buffer information, overhead (i) is an average frame length of the plurality of buffer frames included in the target buffer information, T0+3*SIFS+Time(MU BA)+Time(Basic variant Trigger)+Time(TB PPDU(i))<=delay time(i), T0+T1 is a full time duration for completing overall interaction between the target station and an AP, SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time(TB PPDU(i)) is a time duration that the target station transmits the target buffer information and Time(TB PPDU(i))=(buffer size(i)*overhead(i))/Vi, Vi is a physical layer transmission rate of the target station under the allocation of the target RU and Vi=V(i)max*N(i)/N(all), V(i)max is a physical layer transmission rate negotiated by the target station during full bandwidth transmission, N(all) is the number of subcarriers in a full bandwidth, and N(i) is the number of subcarriers in the target RU. In this embodiment, when it is determined that the first type station includes the plurality of stations, the target information includes the target delay length, and the transmission of the target buffer information in the plurality of stations included in the first type station needs to be accomplished at one time, and the target station is the ith station in the plurality of stations, the target RU may be allocated for the target station through the above formula N(i)>=B(i)*N(all)/(A(i)*V(i)max) and N(1)+N(2)+ . . . +N(n)<=N(all), i.e., the allocation of the target RUs for all stations included in the first type station needs to meet requirements of the above formula, and the plurality of stations subsequently transmit the uplink TB PPDU by using the frequency band corresponding to the target RU allocated by the AP, such that the purpose of accomplishing of a plurality of low delay data transmissions by the plurality of stations through a single uplink transmission within delay time may be achieved. Therefore, the problem in the related art that data transmission with high low delay requirements cannot be met is solved, thereby achieving the effect of improving data transmission efficiency.

In an optional embodiment, when it is determined that the first type station includes the plurality of stations, the target information includes the target delay length, it is determined that the first type station needs to accomplish the transmission of buffer information to be transmitted in the plurality of stations included in the first type station through a plurality of transmissions, and the target station is an ith station in the plurality of stations included in the first type station, the target RU is allocated to the target station based on the following formula: B(i,1)/N(i,1)+B(i,2)/N(i,2)+ . . . +B(i,m)/N(i,m)<=C*V(i)max/N(all) and N(1,j)+N(2,j)+ . . . +N(n,j)<=N(all), where N(i,j) represents the number of subcarriers in the target RU allocated to the target station during a jth transmission, 0<j≤m, N(all) is the number of subcarriers in a full bandwidth, B(i,j)=buffer size(i,j)*overhead(i,j), buffer size (i,j) is the number of buffer frames included in the target buffer information that is transmitted by the target station in a jth transmission, overhead (i,j) is an average frame length of the plurality of buffer frames included in the target buffer information that is transmitted by the target station in the jth transmission, C=delay time(i)−m*[3*SIFS+Time(MU BA)+Time(Basic variant Trigger)]−T0, delay time(i) is the target delay length, SIFS is a short interframe gap for frame interaction between the target station and the AP, T(i,j)=3*SIFS+Time(MU BA)+Time(Basic variant Trigger)+Time[TB PPDU(i)], T0+T(i,1)+T(i,2) . . . +T(i,m)<=delay time(i), Time(MU BA) is a time duration that the AP replies MU BA to the target station, Time(Basic variant Trigger) is a time duration that the AP allocates the target RU to the target station, Time(TB PPDU(i,j) is a time duration of the jth transmission of the target buffer information by the target station and Time[TB PPDU(i,j)]=[buffer size(i,j)*overhead(i,j)]/V(i,j), V(i,j) is a physical layer transmission rate of the target station in the jth transmission and V(i,j)=V(i)max*N(i,j)/N(all), V(i)max is a physical layer transmission rate negotiated by the target station during full bandwidth transmission, N(all) is the number of subcarriers in a full bandwidth, N(i,j) is the number of subcarriers in the target RU allocated by the target station at the jth transmission. In this embodiment, when it is determined that the first type station includes the plurality of stations and the target information includes the target delay length, but low delay buffer data of the plurality of stations cannot be guaranteed to be completed in a single OFDMA uplink transmission, i.e., when it is determined that the plurality of stations all need to accomplish the transmission of the target buffer information through a plurality of transmissions, and the target station is the ith station in the plurality of stations, the target RU may be allocated for the target station through the formula B(i,1)/N(i,1)+B(i,2)/N(i,2)+ . . . +B(i,m)/N(i,m)<=C*V(i)max/N(all) and N(1,j)+N(2,j)+ . . . +N(n,j)<=N(all), where N(i,j) represents the number of subcarriers in the target RU allocated to the ith station in the plurality of stations during the jth transmission, i.e., the target RUs allocated for all the stations included in the first type station during each transmission need to meet requirements of the above formula, and the plurality of stations subsequently transmit the uplink TB PPDU by using frequency bands corresponding to the target RUs allocated by the AP, such that the purpose of accomplishing a plurality of low delay data transmissions by the plurality of stations through a plurality of uplink transmissions within delay time may be achieved. Therefore, the problem in the related art that data transmission with high low delay requirements cannot be met is solved, thereby achieving the effect of improving data transmission efficiency.

It is apparent that the embodiments described above are only a part of the embodiments of the present disclosure, rather than all of the embodiments. The present disclosure is specifically described below in reference with specific embodiments.

Scenario 1: A Single Low Delay STA, and a Single Uplink Transmission

Figure 5:
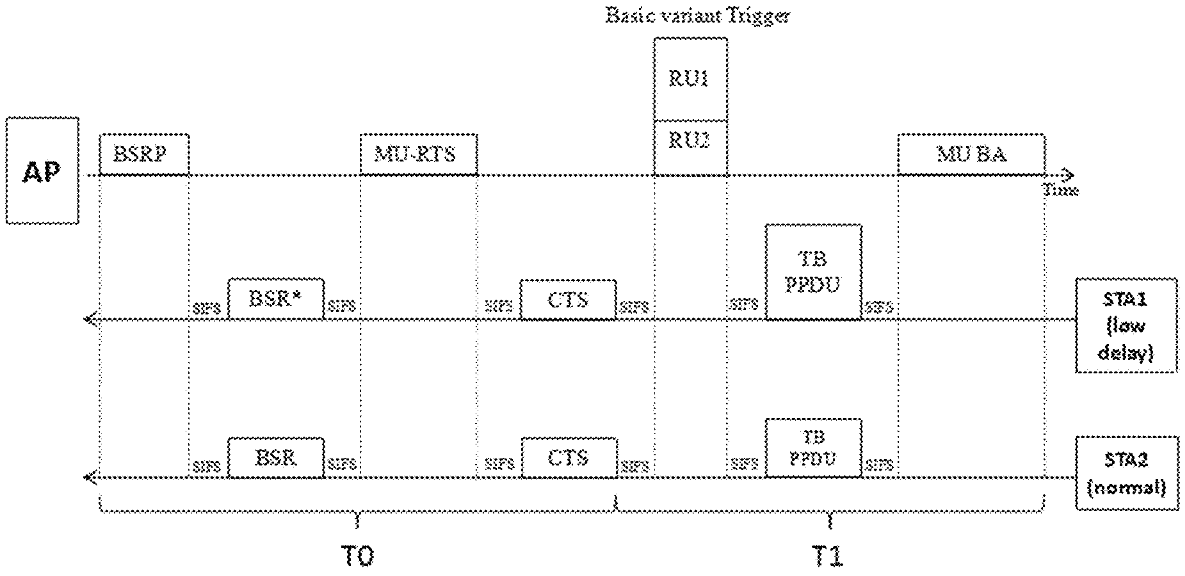
FIG. 5 is an example diagram I of a resource unit allocation method according to a specific embodiment of the present disclosure.
Figure 6:
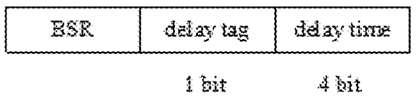
FIG. 6 is a schematic format diagram of a BSR control field according to an embodiment of the present disclosure.

FIG. 5 is an example diagram I of a resource unit allocation method according to a specific embodiment of the present disclosure. As shown in FIG. 5, an STA1 reports low delay buffer information, and an STA2 reports non-low delay buffer information. FIG. 6 is a schematic format diagram of a BSR control field according to an embodiment of the present disclosure. On the basis of UL-OFDMA in the related art, 2 fields of a delay tag and delay time are added for a BSR of buffer information reported by the STA. As shown in FIG. 6, the length of the delay tag is 1 bit. When the field is 1, it indicates that the reported buffer information is low delay data information, otherwise the buffer information indicates non-delay data information. The length of the delay time is 4 bits, in Tms, indicating that the STA expects that reported low delay data is transmitted within the delay time. When the delay tag is 0, the delay time is invalid. BSR* in FIG. 5 corresponds to a format of a BSR control field in FIG. 6.

In FIG. 5, an AP allocates a larger RU space for the subsequent UL-OFDMA transmission of the STA1 in Basic variant Trigger, so as to ensure that the low delay buffer data of the STA1 may be transmitted in the subsequent UL-OFDMA. A mechanism that the AP allocates an RU is as follows:

$T0+T1$<=delay time;

while $T1$=3*SIFS+Time(MU BA)+Time(Basic variant Trigger)+Time(TB PPDU);

Time(TB PPDU)=(buffer size*overhead)/$V1$;

$V1=V\max*N1/N(\text{all})$;

Supposing $A$=delay time−$T0$−3*SIFS−Time(MU BA)−Time(Basic variant Trigger), $B$=buffer size*overhead;

then $N1>=B*N(\text{all})/(A*V\max)$;

in combination with RU allocation criteria of OFDMA, which RU is allocated is determined, e.g., 26-tone, 52-tone, 106 tone, etc.

It is to be noted that, Vmax is a physical layer transmission rate negotiated by the STA1 during full bandwidth transmission; N1 is the number of subcarriers in an RU allocated to the STA1; N(all) is the number of subcarriers in a full bandwidth; V1 is a physical layer transmission rate of the STA1 under the allocation of the RU; and buffer size is the size of uplink data buffered by the STA1. Through this embodiment, the purpose of transmitting low delay data information by the single low delay STA through a single uplink transmission is realized.

Scenario 2: A Single Low Delay STA, and a Plurality of Uplink Transmissions

Figure 7:
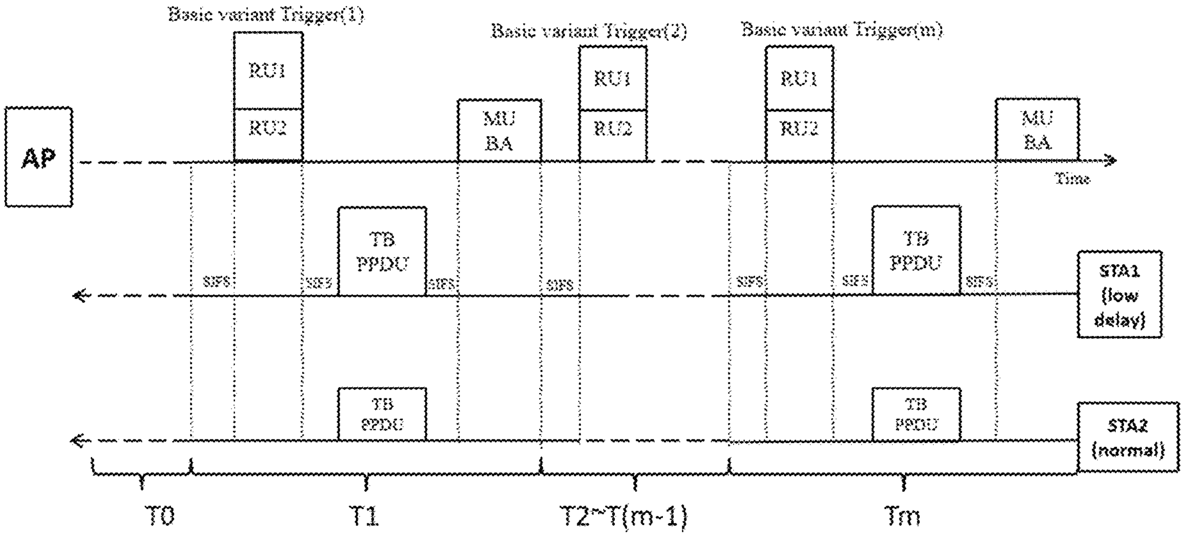
FIG. 7 is an example diagram II of a resource unit allocation method according to a specific embodiment of the present disclosure.

On the basis of the Scenario 1, RU allocation cannot guarantee the accomplishment of a single OFDMA uplink transmission of low delay buffer data of the STA1 (which may be limited by frame length constraints for TB PPDU uplink transmissions, total bandwidth or comprehensive considerations of RU allocation for other STAs), such that a scenario of a plurality of uplink transmissions is introduced. FIG. 7 is an example diagram II of a resource unit allocation method according to a specific embodiment of the present disclosure. As shown in FIG. 7:

if the UL-OFMDA transmission is performed for $m$ times, buffer size($i$)+ . . . buffer size($m$)=buffer size;

$V(j)=V\max*N(j)/N(\text{all})$ (an RU size for each division may be different, i.e., $N(j)$ may be different);

Time[TB PPDU($j$)]=[buffer size($j$)*overhead($j$)]/$V(j)$;

$T0+T1+\ldots+Tm<=$delay time;

$Tj$=3*SIFS+Time(MU Block-ACK)+Time(Trigger)+Time[TB PPDU($j$)], where $0<j\leq=n$;

Let $C$=delay time−$m$*[3*SIFS+Time(MU Block-ACK)+Time(Trigger)]−$T0$, $Bj$=buffer size($j$)*overhead($j$);

$B1/N1+B2/N2+\ldots+Bm/N(m)<=C*V\max/N(\text{all})$; and the formula is established during the plurality of transmissions.

It is to be noted that, N(j) represents the number of subcarriers in the RU allocated to the STA1 in a jth transmission, and V(j) represents a physical layer rate of the STA1 in the jth transmission. Through this embodiment, the purpose of transmitting low delay data information by the single low delay STA through a plurality of uplink transmissions is realized.

Scenario 3: a plurality of low delay STAs, and a single uplink transmission

Figure 8:
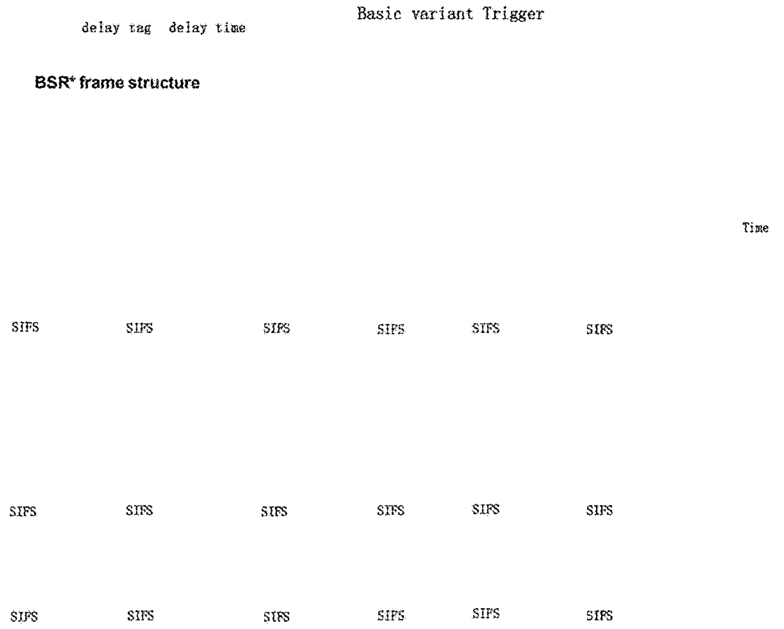
FIG. 8 is an example diagram III of a resource unit allocation method according to a specific embodiment of the present disclosure.

FIG. 8 is an example diagram III of a resource unit allocation method according to a specific embodiment of the present disclosure. As shown in FIG. 8, STA1-STAn report low delay buffer information, and an STA0 is a traditional STA.

A full bandwidth transmission rate V(i)max of an STA1 is well known, and a transmission rate Vi=V(i)max*N(i)/N(all) after RU allocation is selected.

Then in $T1$, Time(TB PPDU($i$))=(buffer size($i$)*overhead($i$))/$Vi$.

$T0+T1<=$delay time, that is:

$T0$+3*SIFS+Time(MU BA)+Time(Basic variant Trigger)+Time(TB PPDU($i$))<=delay time($i$).

Let $A(i)$=delay time($i$)−$T0$−3*SIFS−Time(MU BA)−Time(Basic variant Trigger), $B(i)$=buffer size($i$)*overhead($i$);

then $N(i)>=B(i)*N(\text{all})/(A(i)*V(i)\max)$.

Thus for all STA1-STAn, the following requirements need to be met.

For any $0<i<=n$, $N(i)>=B(i)*N(\text{all})/(A(i)*V(i)\max)$. 1.

$N(1)+N(2)+\ldots+N(n)<=N(\text{all})$. 2.

Through this embodiment, the purpose of accomplishing the transmission of a plurality of pieces of low delay data information by a plurality of low delay STAs through a single uplink transmission is realized. It is to be noted that, if a condition 2 cannot be met, the single UL-OFDMA cannot accomplish the low delay buffer data transmissions of all STAs, and a plurality of UL-OFDMA transmissions need to be performed.

Figure 9:
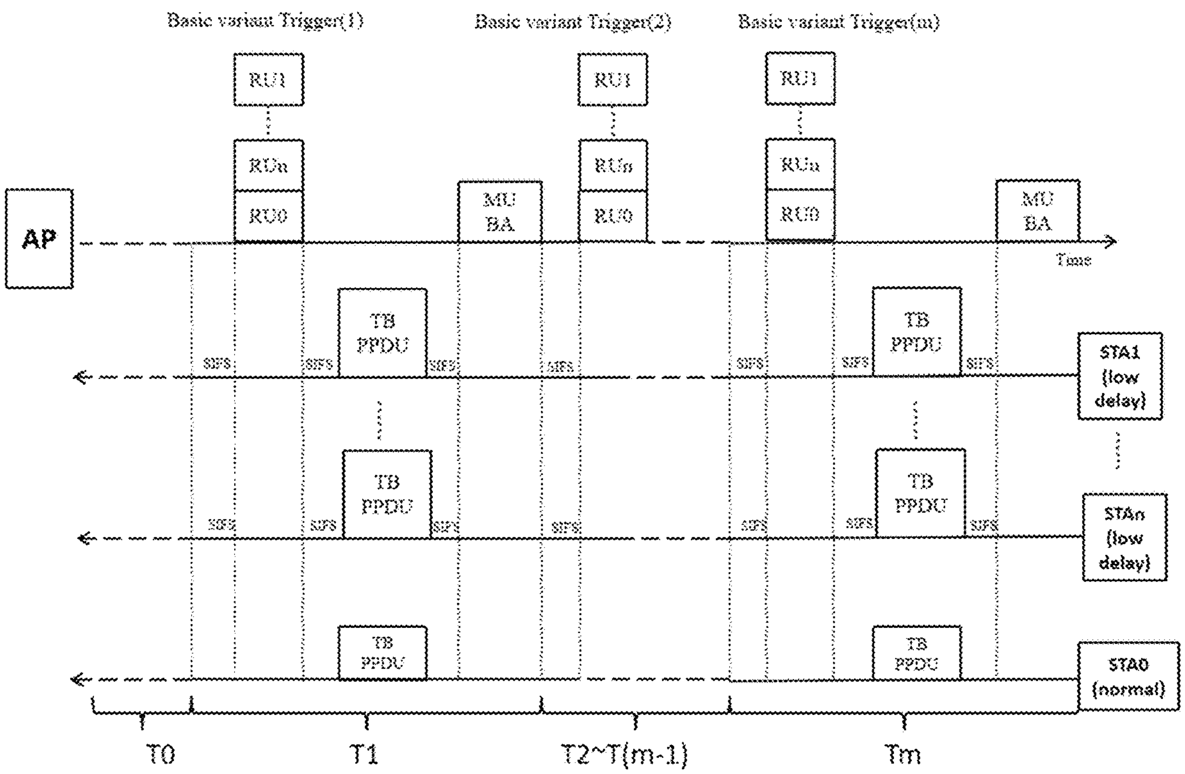
FIG. 9 is an example diagram IV of a resource unit allocation method according to a specific embodiment of the present disclosure.

Scenario 4: A Plurality of Low Delay STAs, and a Plurality of Uplink Transmissions FIG. 9 is an example diagram IV of a resource unit allocation method according to a specific embodiment of the present disclosure. As shown in FIG. 9, STAl-STAn report low delay buffer information, and an STA0 is a traditional STA. for an STA1:

if the UL-OFMDA transmission is performed for $m$ times, buffer size($i$,1)+ . . . buffer size($i,m$)=buffer size($i$);

in a jth UL-OFMDA transmission, STA(i):

$V(i,j)=V(i)\max*N(i,j)/N(\text{all})$ (an RU size for each division may be different, i.e., $N(j)$ may be different);

Time[TB PPDU($i,j$)]=[buffer size($i,j$)*overhead($i,j$)]/$V(i,j)$;

$T0+T1+\ldots+Tm<=$delay time($i$):

$T(i,j)$=3*SIFS+Time(MU BA)+Time(Trigger)+Time[TB PPDU($i$)], where $0<i\leq=n$, Let $C$=delay time($i$)−$m$*[3*SIFS+Time(MU Block-ACK)+Time(Trigger)]−$T0$, $B(i,j)$=buffer size($i,j$)*overhead($i,j$);

then $B(i,1)/N(i,1)+B(i,2)/N(i,2)+\ldots+B(i,m)/N(i,m)<=C*V(i)\max/N(\text{all})$, such that for STA1-STAn, the following conditions need to be met.

For any $0<i<=n$, $B(i,1)/N(i,1)+B(i,2)/N(i,2)+\ldots+B(i,m)/N(i,m)<=C*V(i)\max/N(\text{all})$. 1.

For any $0<j<=m$, $N(1,j)+N(2,j)+\ldots+N(n,j)<=N(\text{all})$. 2.

It is to be noted that, N(i,j) represents the number of subcarriers in an RU allocated to the STA1 in the jth transmission. Through this embodiment, the purpose of accomplishing the transmission of a plurality of pieces of low delay data information by a plurality of low delay STAs through a plurality of uplink transmissions is realized.

Through the above embodiments, the delay tag and delay time fields are added to a BSR control filed, so as to identify whether data buffered by the STA is low delay data and expected transmission time. The AP preferably guarantees a transmission mechanism of low delay data through RU allocation according to the collected low delay buffer information, such that the purpose of allocating RUs according to low delay requirements of data transmission is realized, and the problem in the related art that data transmission with high low delay requirements cannot be met is solved, thereby achieving the effect of improving data transmission efficiency.

From the above descriptions about the implementation modes, those skilled in the art may clearly know that the method according to the foregoing embodiments may be implemented in a manner of combining software and a necessary universal hardware platform, and of course, may also be implemented through hardware, but the former is a preferred implementation mode under many circumstances. Based on such an understanding, the technical solutions of the present disclosure substantially or parts making contributions to the conventional art may be embodied in form of software product, and the computer software product is stored in a storage medium (for example, a ROM/RAM), a magnetic disk and an optical disk), including a plurality of instructions configured to enable a terminal device (which may be a mobile phone, a computer, a server, a network device, or the like) to execute the method in each embodiment of the present disclosure.

This embodiment further provides a resource unit allocation apparatus. The apparatus is configured to implement the above embodiments and the preferred implementations, and what has been described will not be described again. As used below, the term "module" may be a combination of software and/or hardware that implements a predetermined function. Although the apparatus described in the following embodiments is preferably implemented in software, but implementations in hardware, or a combination of software and hardware, are also possible and conceived.

Figure 10:
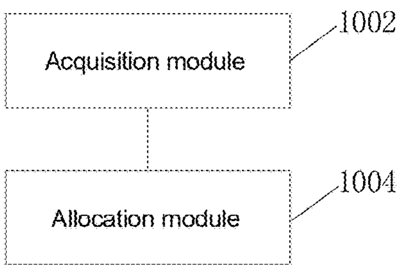
FIG. 10 is a block diagram of a resource unit allocation apparatus according to an embodiment of the present disclosure.

FIG. 10 is a block diagram of a resource unit allocation apparatus according to an embodiment of the present disclosure. As shown in FIG. 10, the apparatus includes an acquisition module and an allocation module.

The acquisition module 1002 is configured to acquire target information reported by a target station. The target information includes target buffer information to be transmitted by the target station, and at least one of the following pieces of information: the type of the target buffer information or target delay information of the target buffer information.

The allocation module 1004 is configured to allocate a target Resource Unit (RU) to the target station based on the target information, and instruct the target station to transmit the target buffer information by using the target RU.

In an optional embodiment, the apparatus may determine that the type of the target buffer information is low delay and the target delay information is valid data when the target information includes a first field and a second field and when the first field includes a first character. The first field is used for identifying the type of the target buffer information, and the second field is used for identifying the target delay information.

In an optional embodiment, the apparatus may determine that the type of the target buffer information is low delay and the target delay information is invalid data when the target information includes a first field and a second field and when the first field includes a second character. The first field is used for identifying the type of the target buffer information, and the second field is used for identifying the target delay information.

In an optional embodiment, the apparatus may determine that the type of the target buffer information is low delay and the target delay information is valid data when the target information only includes a second field. The second field is used for identifying the target delay information.

In an optional embodiment, when the target information only includes the first field, the apparatus may determine the type of the target buffer information and the target delay information of the target buffer information based on the type of an Access Classification (AC) included in the target buffer information. The first field is used for identifying the type of the target buffer information.

In an optional embodiment, the AC includes at least one of the following classifications: AC_Voice, AC_Video, AC_Best-effort, or AC_Background. The AC_Voice has a higher priority than the AC_Video, the AC_Video has a higher priority than the AC_Best-effort, and the AC_Best-effort has a higher priority than the AC_Background. The apparatus may determine the type of the target buffer information and the target delay information of the target buffer information based on the type of the AC included in the target buffer information through the following manners. When the AC included in the target buffer information includes a first target classification, it is determined that the type of the target buffer information is low delay, where the first target classification is a classification that is preset with corresponding default delay in advance; and the target delay information is determined based on default delay information corresponding to a classification with the highest priority included in the first target classification.

In an optional embodiment, the AC includes at least one of the following classifications: AC_Voice, AC_Video, AC_Best-effort, or AC_Background. The AC_Voice has a higher priority than the AC_Video, the AC_Video has a higher priority than the AC_Best-effort, and the AC_Best-effort has a higher priority than the AC_Background. The apparatus may determine the type of the target buffer information and the target delay information of the target buffer information based on the type of the AC included in the target buffer information through the following manners. When the AC included in the target buffer information only includes a second target classification, it is determined that the type of the target buffer information is non-low delay. The second target classification is a classification that is not set with corresponding default delay.

In an optional embodiment, the target delay information includes at least one of the following: a target delay length; or target delay jitter information.

In an optional embodiment, the allocation module 1004 includes: a determination unit, configured to determine first type stations included in a plurality of stations that currently need to perform buffer information transmission, where the first type station is a station that needs to transmit low delay information, and the first type station includes the target station; and an allocation unit, configured to allocate the target RU to the target station based on the target information and the first type station.

In an optional embodiment, the allocation unit includes a first allocation sub-unit, configured to allocate the target RU for the target station based on the following formula when determining that the first type station only includes the target station and the target information includes the target delay length, and determining that the transmission of the target buffer information needs to be accomplished through a plurality of transmissions: $N1>=B*N(all)/(A*Vmax)$, where N1 is the number of subcarriers in the target RU, B=buffer size*overhead, buffer size is the number of buffer frames included in the target buffer information, overhead is an average frame length of the plurality of buffer frames included in the target buffer information, A=delay time−T0−3*SIFS−Time(MU BA)−Time(Basic variant Trigger), delay time is the target delay length, T0+T1 is a full time duration for completing overall interaction between the target station and an Access Point (AP), T1=3*SIFS+Time(MU BA)+Time(Basic variant Trigger)+Time(TB PPDU), SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time(TB PPDU) is a time duration that the target station transmits the target buffer information, Time(TB PPDU)=(buffer size*overhead)/V1, V1 is a physical layer transmission rate of the target station under the allocation of the target RU and V1=Vmax*N1/N(all), Vmax is a physical layer transmission rate negotiated by the target station during full bandwidth transmission, and N(all) is the number of subcarriers in a full bandwidth.

In an optional embodiment, the allocation unit includes a second allocation sub-unit, configured to allocate the target RU for the target station based on the following formula when determining that the first type station only includes the target station and the target information includes the target delay length, and determining that the transmission of the target buffer information needs to be accomplished through a plurality of transmissions: B1/N1+B2/N2+ . . . +Bm/N(m) <=C*Vmax/N(all), where Bj=buffer size(j)*overhead(j), 0<j≤m, buffer size (j) is the number of buffer frames included in the target buffer information that is transmitted by the target station in a jth transmission, overhead (j) is an average frame length of the plurality of buffer frames included in the target buffer information that is transmitted by the target station in the jth transmission, C=delay time−m*[3*SIFS+Time(MU BA)+Time(Basic variant Trigger)]−T0, delay time is the target delay length, Tj=3*SIFS+Time (MU BA)+Time(Basic variant Trigger)+Time[TB PPDU (j)], T0+TT+T2 . . . +Tm is a full time duration for completing overall interaction between the target station and an AP, SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time(TB PPDU (j)) is a time duration of the jth transmission of the target buffer information by the target station, Time[TB PPDU(j)] =[buffer size(j)*overhead(j)]N(j), Vj is a physical layer transmission rate of the target station in the jth transmission and V(j)=Vmax*N(j)/N(all), Vmax is a physical layer transmission rate negotiated by the target station during full bandwidth transmission, NO) is the number of subcarriers in the target RU allocated by the target station at the jth transmission, and N(all) is the number of subcarriers in a full bandwidth.

In an optional embodiment, the allocation unit includes a third allocation sub-unit, configured to allocate the target RU for the target station based on the following formula when determining that the first type station includes the plurality of stations and the target information includes the target delay length, determining that the transmission of buffer information to be transmitted in the plurality of stations included in the first type station needs to be accomplished through a single transmission, and the target station being an ith station in the plurality of stations included in the first type station: N(i)>=B(i)*N(all)/(A(i)*V(i)max) and N(1)+N(2)+ . . . +N(n)<=N(all), where n is the number of all stations included in the first type station, A(i)=delay time(i)−T0−3*SIFS−Time(MU BA)−Time(Basic variant Trigger), B(i) =buffer size(i)*overhead(i), buffer size (i) is the number of buffer frames included in the target buffer information, overhead (i) is an average frame length of the plurality of buffer frames included in the target buffer information, T0+3*SIFS+Time(MU BA)+Time(Basic variant Trigger)+ Time(TB PPDU(i))<=delay time(i), T0+T1 is a full time duration for completing overall interaction between the target station and an AP, SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time(TB PPDU(i)) is a time duration that the target station transmits the target buffer information and Time(TB PPDU(i))=(buffer size(i)*overhead(i))/Vi, Vi is a physical layer transmission rate of the target station under the allocation of the target RU and Vi=V(i)max*N(i)/N(all), V(i) max is a physical layer transmission rate negotiated by the target station during full bandwidth transmission, N(all) is the number of subcarriers in a full bandwidth, and N(i) is the number of subcarriers in the target RU.

In an optional embodiment, the allocation unit includes a fourth allocation sub-unit, configured to allocate the target RU for the target station based on the following formula when determining that the first type station includes the plurality of stations and the target information includes the target delay length, and determining that the first type station needs to accomplish the transmission of buffer information to be transmitted in the plurality of stations included in the first type station through a plurality of transmissions, and the target station being an ith station in the plurality of stations included in the first type station: B(i,1)/N(i,1)+B(i,2)/N(i, 2)+ . . . +B(i,m)/N(i,m)<=C*V(i)max/N(all) and N(1,j)+N (2,j)+ . . . +N(n,j)<=N(all), where N(i,j) represents the number of subcarriers in the target RU allocated to the target station during a jth transmission, 0<j≤m, N(all) is the number of subcarriers in a full bandwidth, B(i,j)=buffer size(i,j)*overhead(i,j), buffer size (i,j) is the number of buffer frames included in the target buffer information that is transmitted by the target station in a jth transmission, overhead (i,j) is an average frame length of the plurality of buffer frames included in the target buffer information that is transmitted by the target station in the jth transmission, C=delay time(i)−m*[3*SIFS+Time(MU BA)+Time(Basic variant Trigger)]−T0, delay time (i) is the target delay length, SIFS is a short interframe gap for frame interaction between the target station and the AP, T(i,j)=3*SIFS+Time (MU BA)+Time(Basic variant Trigger)+Time[TB PPDU (i)], T0+T(i,1)+T(i,2) . . . +T(i,m)<=delay time(i), Time(MU BA) is a time duration that the AP replies MU BA to the target station, Time(Basic variant Trigger) is a time duration that the AP allocates the target RU to the target station, Time(TB PPDU(i,j) is a time duration of the jth transmission of the target buffer information by the target station and Time[TB PPDU(i,j)]=[buffer size(i,j)*overhead(i,j)]/V(i,j), V(i,j) is a physical layer transmission rate of the target station in the jth transmission and V(i,j)=V(i)max*N(i,j)/N (all), V(i)max is a physical layer transmission rate negotiated by the target station during full bandwidth transmission, N(all) is the number of subcarriers in a full bandwidth, N(i,j) is the number of subcarriers in the target RU allocated by the target station at the jth transmission.

It is to be noted that, each of the above modules may be implemented by software or hardware. For the latter, it may be implemented in the following manners, but is not limited to the follow: the above modules are all located in a same processor; or the above modules are located in different processors in any combination.

An embodiment of the present disclosure further provides a computer-readable storage medium. The computer-readable storage medium stores a computer program. Steps in any one of the above method embodiments are executed when the computer program is configured to operate.

In an exemplary embodiment, the computer-readable storage medium may include, but is not limited to, a USB flash disk, a Read-Only Memory (ROM), a Random Access Memory (RAM), and various media that can store computer programs, such as a mobile hard disk, a magnetic disk, or an optical disk.

This embodiment of the present disclosure further provides an electronic apparatus. The electronic apparatus includes a memory and a processor. The memory is configured to store a computer program. The processor is configured to run the computer program to execute steps in any one of method embodiments described above.

In an exemplary embodiment, the electronic apparatus may further include a transmission device and an input/output device. The transmission device is connected to the processor. The input/output device is connected to the processor.

For specific examples in this embodiment, refer to the examples described in the foregoing embodiments and the exemplary implementations, and this embodiment will not be repeated thereto.

It is apparent that those skilled in the art should understand that the above-mentioned modules or steps of the present disclosure may be implemented by a general computing device, and may also be gathered together on a single computing device or distributed in network composed of multiple computing devices. The above mentioned modules or steps of the present application may be implemented with program codes executable by the computing device, so that may be stored in a storage device for execution by the computing device, and in some cases, the steps shown or described may be performed in a different sequence than herein, or can be fabricated into individual integrated circuit modules respectively, or multiple modules or steps thereof are fabricated into a single integrated circuit module for implementation. In this way, the present disclosure is not limited to any specific combination of hardware and software.

The above are only the preferred embodiments of the disclosure and are not intended to limit the disclosure. For those skilled in the art, the disclosure may have various modifications and variations. Any modifications, equivalent replacements, improvements and the like made within the principle of the disclosure shall fall within the scope of protection of the present disclosure.

What is claimed is:

1. A resource unit allocation method, comprising:

acquiring target information reported by a target station, wherein the target information comprises target buffer information to be transmitted by the target station, and at least one of the following information: a type of the target buffer information, target delay information of the target buffer information; and allocating a target Resource Unit (RU) to the target station based on the target information, and instructing the target station to transmit the target buffer information by using the target RU;

in a case that the target information comprises a first field and a second field, and the first field comprises a first character, determining that the type of the target buffer information is low delay and the target delay information is valid data, wherein the first field is used for identifying the type of the target buffer information, and the second field is used for identifying the target delay information.

2. The method according to claim 1, comprising:

in a case that the target information comprises a first field and a second field, and the first field comprises a second character, determining that the type of the target buffer information is non-low delay and the target delay information is invalid data, wherein the first field is used for identifying the type of the target buffer information, and the second field is used for identifying the target delay information.

3. The method according to claim 1, comprising:

in a case that the target information only comprises a second field, determining that the type of the target buffer information is low delay and the target delay information is valid data, wherein the second field is used for identifying the target delay information.

4. The method according to claim 1, comprising:

in a case that the target information only comprises a first field, determining the type of the target buffer information and the target delay information of the target buffer information based on the type of an Access Classification (AC) comprised in the target buffer information, wherein the first field is used for identifying the type of the target buffer information.

5. The method according to claim 4, wherein the AC comprises at least one of the following classifications: AC_Voice, AC_Video, AC_Best-effort, or AC_Background, wherein the AC_Voice has a higher priority than the AC_Video, the AC_Video has a higher priority than the AC_Best-effort, and the AC_Best-effort has a higher priority than the AC_Background; and determining the type of the target buffer information and the target delay information of the target buffer information based on the type of the AC comprised in the target buffer information comprises:

in a case that the AC comprised in the target buffer information comprises a first target classification, determining that the type of the target buffer information is low delay, wherein the first target classification is a classification that is preset with corresponding default delay in advance; and determining the target delay information based on default delay information corresponding to a classification with the highest priority comprised in the first target classification.

6. The method according to claim 4, wherein the AC comprises at least one of the following classifications: AC_Voice, AC_Video, AC_Best-effort, or AC_Background, wherein the AC_Voice has a higher priority than the AC_Video, the AC_Video has a higher priority than the AC_Best-effort, and the AC_Best-effort has a higher priority than the AC_Background; and determining the type of the target buffer information and the target delay information of the target buffer information based on the type of the AC comprised in the target buffer information comprises:

in a case that the AC comprised in the target buffer information only comprises a second target classification, determining that the type of the target buffer information is non-low delay, wherein the second target classification is a classification that is not set with corresponding default delay.

7. The method according to claim 1, wherein the target delay information comprises at least one of the following: a target delay length, target delay jitter information.

8. The method according to claim 1, wherein allocating the target RU to the target station based on the target information comprises:

determining first type stations comprised in a plurality of stations that currently need to perform buffer information transmission, wherein the first type station is a station that needs to transmit low delay information, and the first type station comprises the target station; and allocating the target RU to the target station based on the target information and the first type station.

9. The method according to claim 8, wherein, when it is determined that the first type station only comprises the target station, the target information comprises the target delay length, and it is determined that the transmission of the target buffer information needs to be accomplished through a single transmission, the target RU is allocated to the target station based on the following formula:

$N1>B*N(\text{all})/(A*V\max)$, wherein

N1 is the number of subcarriers in the target RU, B=buffer size*overhead, buffer size is the number of buffer frames comprised in the target buffer information, overhead is an average frame length of the plurality of buffer frames comprised in the target buffer information, A=delay time−T0−3*SIFS−Time(MU BA)−Time (Basic variant Trigger), delay time is the target delay length, T0+T1 is a full time duration for completing overall interaction between the target station and an Access Point (AP), T1=3*SIFS+Time(MU BA)+Time (Basic variant Trigger)+Time(TB PPDU), SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time(TB PPDU) is a time duration that the target station transmits the target buffer information, Time (TB PPDU)=(buffer size*overhead)/V1, V1 is a physical layer transmission rate of the target station under the allocation of the target RU and V1=Vmax*N1/N(all), Vmax is a physical layer transmission rate negotiated by the target station during full bandwidth transmission, and N(all) is the number of subcarriers in a full bandwidth.

10. The method according to claim 8, wherein, when it is determined that the first type station only comprises the target station, the target information comprises the target delay length, and it is determined that the transmission of the target buffer information needs to be accomplished through a plurality of transmissions, the target RU is allocated to the target station based on the following formula:

$B1/N1+B2/N2+\ldots+Bm/N(m)<=C*V\max/N(\text{all})$, wherein

Bj=buffer size(j)*overhead(j), 0<j≤m, buffer size (j) is the number of buffer frames comprised in the target buffer information that is transmitted by the target station in a jth transmission, overhead (j) is an average frame length of the plurality of buffer frames comprised in the target buffer information that is transmitted by the target station in the jth transmission, C=delay time−m*[3*SIFS+Time(MU BA)+Time(Basic variant Trigger)]−T0, delay time is the target delay length, Tj=3*SIFS+Time(MU BA)+Time(Basic variant Trigger)+Time[TB PPDU(j)], T0+T1+T2 . . . +Tm is a full time duration for completing overall interaction between the target station and an AP, SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time (TB PPDU(j)) is a time duration of the jth transmission of the target buffer information by the target station, Time[TB PPDU(j)]=[buffer size(j)*overhead(j)]/V(j), Vj is a physical layer transmission rate of the target station in the jth transmission and V(j)=Vmax*N(j)/N (all), Vmax is a physical layer transmission rate negotiated by the target station during full bandwidth transmission, N(j) is the number of subcarriers in the target RU allocated by the target station at the jth transmission, and N(all) is the number of subcarriers in a full bandwidth.

11. The method according to claim 8, wherein, when it is determined that the first type station comprises the plurality of stations, the target information comprises the target delay length, it is determined that the transmission of buffer information to be transmitted in the plurality of stations comprised in the first type station needs to be accomplished through a single transmission, and the target station is an ith station in the plurality of stations comprised in the first type station, the target RU is allocated to the target station based on the following formula:

$N(i)>=B(i)*N(\text{all})/(A(i)*V(i)\max)$, and $N(1)+N(2)+\ldots+N(n)<=N(\text{all})$, wherein n is the number of all stations comprised in the first type station, A(i)=delay time(i)−T0−3*SIFS−Time(MU BA)−Time(Basic variant Trigger), B(i)=buffer size(i) *overhead(i), buffer size(i) is the number of buffer frames comprised in the target buffer information, overhead(i) is an average frame length of the plurality of buffer frames comprised in the target buffer information, T0+3*SIFS+Time(MU BA)+Time(Basic variant Trigger)+Time(TB PPDU(i))<=delay time(i), T0+T1 is a full time duration for completing overall interaction between the target station and an AP, SIFS is a short interframe gap for frame interaction between the target station and the AP, Time(MU BA) is a time duration that the AP replies MU BA to the target station, Time(Basic variant Trigger) is a time duration that the AP allocates the target RU to the target station, Time(TB PPDU(i)) is a time duration that the target station transmits the target buffer information and Time (TB PPDU(i))=(buffer size(i)*overhead(i))/Vi, Vi is a physical layer transmission rate of the target station under the allocation of the target RU and Vi=V(i) max*N(i)/N(all), V(i)max is a physical layer transmission rate negotiated by the target station during full bandwidth transmission, N(all) is the number of subcarriers in a full bandwidth, and N(i) is the number of subcarriers in the target RU.

12. The method according to claim 8, wherein, when it is determined that the first type station comprises the plurality of stations, the target information comprises the target delay length, it is determined that the first type station needs to accomplish the transmission of buffer information to be transmitted in the plurality of stations comprised in the first type station through a plurality of transmissions, and the target station is an ith station in the plurality of stations comprised in the first type station, the target RU is allocated to the target station based on the following formula:

$$B(i,1)/N(i,1)+B(i,2)/N(1,2)+ \ldots +B(i,m)/N(i,m)<=N(1,j)+N(2,j)+ \ldots +N(n,j)<=N(\text{all}), \text{ wherein } C*V(i)\max/N(\text{all}), \text{ and}$$

N(i,j) represents the number of subcarriers in the target RU allocated to the target station during a jth transmission, 0<j≤m, N(all) is the number of subcarriers in a full bandwidth, B(i,j)=buffer size(i,j)*overhead(i,j), buffer size(i,j) is the number of buffer frames comprised in the target buffer information that is transmitted by the target station in a jth transmission, overhead (i,j) is an average frame length of the plurality of buffer frames comprised in the target buffer information that is transmitted by the target station in the jth transmission, C=delay time(i)−m*[3*SIFS+Time(MU BA)+Time(Basic variant Trigger)]−T0, delay time(i) is the target delay length, SIFS is a short interframe gap for frame interaction between the target station and the AP, T(i,j)=3*SIFS+Time(MU BA)+Time(Basic variant Trigger)+Time[TB PPDU(i)], T0+T(i,1)+T(i,2) . . . +T(i,m)<=delay time(i), Time(MU BA) is a time duration that the AP replies MU BA to the target station, Time(Basic variant Trigger) is a time duration that the AP allocates the target RU to the target station, Time(TB PPDU(i,j) is a time duration of the jth transmission of the target buffer information by the target station and Time[TB PPDU(i,j)]=[buffer size(i,j)*overhead(i,j)]/V(i,j), V(i,j) is a physical layer transmission rate of the target station in the jth transmission and V(i,j)=V(i)max*N(i,j)/N(all), V(i)max is a physical layer transmission rate negotiated by the target station during full bandwidth transmission, N(all) is the number of subcarriers in a full bandwidth, N(i,j) is the number of subcarriers in the target RU allocated by the target station at the jth transmission.

13. A non-transitory computer-readable storage medium, having a computer program stored therein, wherein the computer program is configured to, when being executed by a processor, implement steps of the method as claimed in claim 1.

14. A resource unit allocation apparatus, comprising:

an acquisition module, configured to acquire target information reported by a target station, wherein the target information comprises target buffer information to be transmitted by the target station, and at least one of the following information: the type of the target buffer information, target delay information of the target buffer information; and an allocation module, configured to allocate a target Resource Unit (RU) to the target station based on the target information, and instruct the target station to transmit the target buffer information by using the target RU;

in a case that the target information comprises a first field and a second field, and the first field comprises a first character, apparatus determines that the type of the target buffer information is low delay and the target delay information is valid data, wherein the first field is used for identifying the type of the target buffer information, and the second field is used for identifying the target delay information.

15. An electronic apparatus, comprising a memory, a processor, and a computer program that is stored in the memory and executable on the processor, the processor is configured to execute the computer program to:

acquire target information reported by a target station, wherein the target information comprises target buffer information to be transmitted by the target station, and at least one of the following information: a type of the target buffer information, target delay information of the target buffer information; and allocate a target Resource Unit (RU) to the target station based on the target information, and instruct the target station to transmit the target buffer information by using the target RU;

in a case that the target information comprises a first field and a second field, and the first field comprises a first character, determine that the type of the target buffer information is low delay and the target delay information is valid data, wherein the first field is used for identifying the type of the target buffer information, and the second field is used for identifying the target delay information.

16. The electronic apparatus according to claim 15, the processor is further configured to:

in a case that the target information comprises a first field and a second field, and the first field comprises a second character, determine that the type of the target buffer information is non-low delay and the target delay information is invalid data, wherein the first field is used for identifying the type of the target buffer information, and the second field is used for identifying the target delay information.

17. The electronic apparatus according to claim 15, the processor is further configured to:

in a case that the target information only comprises a second field, determine that the type of the target buffer information is low delay and the target delay information is valid data, wherein the second field is used for identifying the target delay information.

18. The electronic apparatus according to claim 15, the processor is further configured to:

in a case that the target information only comprises a first field, determine the type of the target buffer information and the target delay information of the target buffer information based on the type of an Access Classification (AC) comprised in the target buffer information, wherein the first field is used for identifying the type of the target buffer information.

* * * * *